United States Patent [19]

Stackman et al.

[11] 4,132,705

[45] Jan. 2, 1979

[54] PROCESS FOR PREPARING A HALOGENATED AROMATIC POLYESTER HAVING A PREDETERMINED MOLECULAR WEIGHT BY SOLUTION POLYMERIZATION TECHNIQUE

[75] Inventors: Robert W. Stackman, Morristown; Arnold J. Rosenthal, Whippany; Marvin L. Sakowitz, East Brunswick, all of N.J.

[73] Assignee: Celanese Corporation, New York, N.Y.

[21] Appl. No.: 819,727

[22] Filed: Jul. 28, 1977

[51] Int. Cl.² ................................................ C08G 63/22
[52] U.S. Cl. ................................. 526/60; 260/33.6 R; 528/191
[58] Field of Search .............. 260/47 C, 33.6 R, 75 M

[56] References Cited
U.S. PATENT DOCUMENTS 3,234,167  2/1966  Sweeny ..................... 260/47 C X
3,883,467  5/1975  Stackman et al. ........... 260/47 C X
4,049,629  9/1977  Pawlak et al. .................. 260/47 C Primary Examiner—Lucille M. Phynes
Attorney, Agent, or Firm—Kenneth A. Genoni

[57] ABSTRACT

A process for preparing certain halogenated aromatic polyesters having a predetermined molecular weight is provided. Such polyesters are prepared by solution polymerization of an appropriate bisphenol and diacid halide wherein the diacid halide is added to a solution containing the bisphenol until the viscosity of the resulting polymer containing solution reaches a predetermined solution viscosity limit at which time the further addition of diacid halide is terminated. The solution viscosity limit is indicative of the attainment of said predetermined molecular weight. The identification of said solution viscosity limit is achieved by a feedback mechanism wherein the viscosity of the polymer containing solution is monitored or sensed during or after the addition of the diacid halide to the bisphenol containing solution.

37 Claims, No Drawings

PROCESS FOR PREPARING A HALOGENATED AROMATIC POLYESTER HAVING A PREDETERMINED MOLECULAR WEIGHT BY SOLUTION POLYMERIZATION TECHNIQUE

BACKGROUND OF THE INVENTION

1. Field of the Invention

This invention relates to the solution polymerization of a halogenated aromatic polyester.

2. Description of the Prior Art

Halogenated aromatic polyesters may be prepared by solution polymerization of a halogenated aromatic bisphenol and a diacid halide. In accordance with typical solution polymerization procedures of the prior art, the reactants are present in a common solvent which also serves as a solvent for the polymer under the conditions of condensation. The bisphenol and the diacid halide are dissolved in separate portions of the chosen solvent. A catalyst or acid acceptor is added and the solutions are combined with agitation. Control of the molecular weight of the resulting polymer has heretofore been achieved by utilizing specific amounts of reactants in accordance with exact stoichiometric calculations. Once the required amount of reactants have been determined in this manner they are rapidly combined and allowed to polymerize until a maximum inherent viscosity is achieved. Although this method is capable of achieving a polymer having a predetermined molecular weight such a procedure possesses many disadvantages when carried out on a commercial scale. For example, commercial starting materials are non-uniform and they vary from batch to batch. Moreover, the starting materials often contain impurities which, although not adversely affecting the resultant polymer, require correction in the above described calculations to account for their presence. Thus, a non-uniform and impure starting material often leads to weighing errors which in turn give rise to deviations from the predetermined molecular weight in the final polymer product.

The presently claimed process avoids the necessity for careful and costly weighing and analysis procedures necessitated by the raw materials used to prepare the polymer and allows for the production of a uniform product of a predetermined molecular weight.

Typical solution polymerization procedures for preparing polyesters are outlined in U.S. Pat. Nos. 3,234,167 and 3,309,334.

It is therefore an object of the presently claimed invention to provide an improved and relatively inexpensive process for the preparation of high molecular weight halogenated aromatic polyesters of the type disclosed herein.

It is a further object of the present invention to provide a process for achieving a halogenated aromatic polyester of a predetermined molecular weight.

It is a still further object of the present invention to provide a process for preparing a halogenated aromatic polyester having a reproducible molecular weight.

It is a further object of the present invention to provide a continuous process for controlling the molecular weight of a halogenated aromatic polyester.

These and other objects as well as the scope, nature and utilization of the invention will be apparent to those skilled in the art from the following description and appended claims.

SUMMARY OF THE INVENTION

In one aspect of the present invention there is provided a process for preparing a halogenated aromatic polyester having a predetermined molecular weight and of the recurring structural formula:

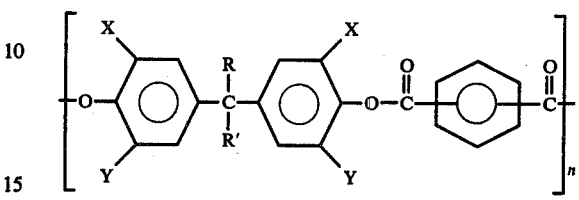

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 10, by the solution polymerization of a halogenated bisphenol and a diacid halide selected from the group consisting of isophthaloyl chloride, terephthaloyl chloride and mixtures thereof which comprises:

(I) providing a solution comprising
  (a) an organic solvent
  (b) a halogenated aromatic bisphenol, and
  (c) an acid acceptor:
(II) adding said diacid halide to the solution of I under conditions sufficient to react said diacid halide with the halogenated aromatic bisphenol of I to form a polymer;
(III) sensing the viscosity of the solution containing the resulting polymer; and
(IV) terminating the addition of the diacid halide in response to the sensing of a predetermined solution viscosity limit.

In another aspect of the present invention there is provided a process for preparing a halogenated aromatic polyester having a predetermined molecular weight and of the recurring structural formula:

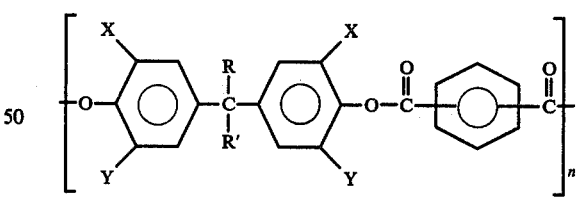

where X which may the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 10, by the solution polymerization of a halogenated bisphenol and a diacid halide selected from the group consisting of isophthaloyl chloride, terephthaloyl chloride and mixtures thereof which comprises:

(I) providing a solution comprising
  (a) an organic solvent
  (b) a halogenated aromatic bisphenol, and
  (c) an acid acceptor;

(II) sensing the viscosity of the solution of I containing the halogenated aromatic bisphenol as said diacid halide is added thereto under conditions sufficient to react the halogenated aromatic bisphenol with said diacid halide to form a polymer thereby causing an increase in solution viscosity;

(III) controlling the addition of the diacid halide in response to the sensed solution viscosity as the sensed solution viscosity approaches a predetermined solution viscosity limit; and (IV) terminating the addition of the diacid halide in response to the sensing of a predetermined solution viscosity limit.

In still another aspect of the present invention there is provided a process for preparing a halogenated aromatic polyester having a predetermined molecular weight and of the recurring structural formula:

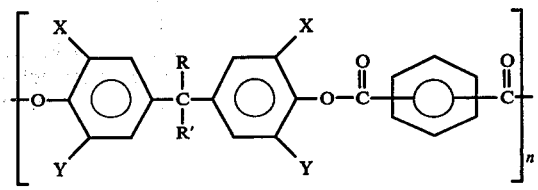

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 10, by the solution polymerization of a halogenated aromatic bisphenol and a diacid halide selected from the group consisting of isophthaloyl chloride, terephthaloyl chloride and mixtures thereof which comprises:

(I) providing a solution comprising:
   (a) an organic solvent
   (b) a halogenated aromatic bisphenol, and
   (c) an acid acceptor;

(II) adding an amount of said diacid halide to the solution of I, said amount being less than the amount necessary to achieve stoichiometric equivalence with the halogenated aromatic bisphenol, under conditions sufficient to react said diacid halide with the halogenated aromatic bisphenol of I to form a polymer;

(III) sensing the viscosity of the solution;

(IV) adding an additional amount of diacid halide in response to the sensed solution viscosity as the sensed solution viscosity approaches a predetermined solution viscosity limit;

(V) terminating the addition of the diacid halide in response to the sensing of the predetermined solution viscosity limit.

DESCRIPTION OF PREFERRED EMBODIMENTS

Halogenated aromatic polyesters prepared in accordance with the process of this invention have recurring units of the structural formula:

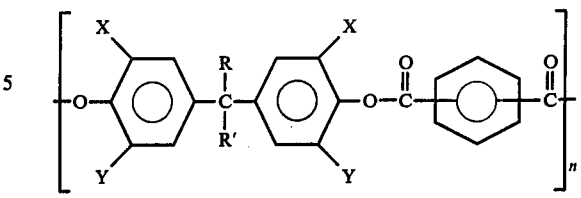

where X which may the same or different is chlorine or bromine, Y which may be the same or different is hydrogen, chlorine, or bromine, R and R' may be the same or different and represented lower alkyl groups (e.g., 1 to 5 carbon atoms), hydrogen, or together constitute a cyclic hydrocarbon group, and n equals at least 10 (e.g., n equals about 40 to 400). Commonly the aromatic polyester utilized in accordance with the process of this invention has a chlorine and/or bromine content of about 15% to 60% by weight based upon the weight of the aromatic polyester, (e.g., a chlorine and/or bromine content of about 25% to 50% by weight). As is apparent from the structural formula, the aromatic polyester is chlorinated and/or brominated in the sense that these substituents are directly attached to an aromatic ring. Preferably the halogen substituents are all bromine.

The halogenated aromatic polyesters conforming to the above-defined formula are prepared by reacting substantially equimolar amounts of (1) an appropriate bisphenol and (2) a diacid halide such as isophthaloyl chloride, terephthaloyl chloride, or mixtures thereof by solution polymerization.

Initially, the appropriate bisphenol is dissolved in a suitable solvent. A catalyst or acid acceptor if utilized is also dissolved in the solvent prior to the addition of the diacid halide.

The bisphenols which are useful in the preparation of the polyesters having recurring units of the formula illustrated above have the structure:

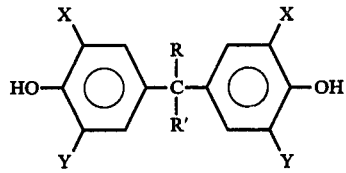

where X, Y, R, and R', have the same significance as set forth hereinabove. Suitable bisphenols which are useful in the practice of this invention include 4,4'-methylene-2,2',6,6'-tetrabromodiphenol; 4,4'-ethylidene-2,2',6,6'-tetrabromodiphenol; 4,4'-isopropylidene-2,2',6,6'-tetrachlorodiphenol (i.e., tetrachlorobisphenol A); 2,2-bis(3-chloro 4-hydroxy phenyl) propane; 2,2-bis(3-bromo 4-hydroxy phenyl) propane; 1,1-bis(5-bromo 4-hydroxy phenyl) ethane; 1,1-bis(5-chloro 4-hydroxy phenyl) ethane; 2,2-bis(3 chloro 5-bromo 4-hydroxy phenyl) propane; bis(3-chloro 4-hydroxy phenyl) methane; bis(3,5-dichloro 4-hydroxy phenyl) methane; 1,1-bis(3,5-dichloro 4-hydroxy phenyl) ethane; as well as their alkali metal salts.

Preferred bisphenols useful in the practice of this invention are 4,4'-isopropylidene-2,2',6,6'-tetrabromodiphenol also known as tetrabromobisphenol A and 4,4'-isopropylidene-2,2',6,6'tetrachlorodiphenol also known as tetrachlorobisphenol A.

Many brominated bisphenols of the above-described structure are commercially available and may be prepared by the condensation of a lower alkyl ketone or aldeyde with two molecules of the phenol and subsequently brominating and/or chlorinating the unsubstituted phenol. This reaction is usually carried out with or without an inert solvent in the presence of an acid. This reaction is summarized in the case of X and Y being bromine in the following equations wherein R and R' have the meanings hereinabove described.

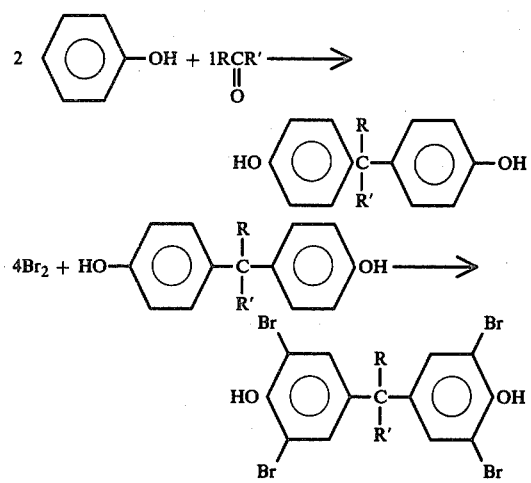

In accordance with normal procedure where solution techniques are employed, the solvent in which the bisphenol and catalyst or acid acceptor are dissolved and in which the reaction takes place should be inert and incapable of reacting with any of the components present therein. Furthermore, the solvent should be a solvent for both the starting materials as well as the resulting polymer. This allows the solvent to help maintain the forming polymer in a more workable form.

Those suitable solvents which may be utilized in the solution polymerization technique described herein include chloroalkanes, aromatic and chloroaromatic compounds such as methylene chloride, chloroform, tetrachloroethane, trichloroethane, chlorohenzene, chlorotoluene, dichloroethane, benzene, toluene, and xylene.

The catalyst or acid acceptor is preferably a tertiary amine which is capable of undergoing a reaction with the bisphenol to form a complex salt. Generally potentially stoichiometric amounts of the bisphenol and the catalyst are employed although a molar excess of catalyst of about 5 to about 10% over the stoichiometric amount is preferred. Thus the ratio of the tertiary amine to the bisphenol is about 2.1 and preferably from about 2.1:1 to about 2.2:1. A bisphenol salt subsequently reacts with the diacid halide and liberates an amine chloride.

Suitable catalysts include any tertiary amine.

Representative examples of suitable tertiary amine catalysts or acid acceptors include triethylamine diamino −2, 2, 2, bicyclo octane, tripropyl amine, dimethyl aniline, pyridine, dimethyl and benzyl amine.

It will be noted that halogenated aromatic polyesters of this invention are prepared by the condensation of bisphenols with the diacid halides of isophthalic acid, terephthalic acid or mixtures thereof. The use of a diacid halide as opposed to other corresponding derivatives is critical, the direct preparation of polymers from bisphenols and free acids being normally not possible.

These acid halides may be derived from a corresponding dicarboxylic acid by any one of several methods well known in the art such as reacting the respective acids with thionyl chloride. Thus, the diacid halide is preferably utilized in the form of a diacid chloride.

It is generally preferred to dissolve the diacid halide in the same type of solvent utilized to prepare the solution containing the halogenated bisphenol. Although this is not critical the employment of a solvent provides for a more accurate control of the addition of the diacid halide to the bisphenol containing solution.

In preparing a preferred brominated aromatic polyester, the diacid halide will generally be utilized in the form of an aromatic acid chloride mixture of about 45 to about 75% (e.g., 60%) by weight isophthaloyl chloride and correspondingly about 55 to 25% (e.g., 40%) by weight terephthaloyl chloride.

In preparing a preferred chlorinated aromatic polyester, the diacid halide will generally be utilized as an aromatic acid chloride mixture of about 90 to about 40%, and preferably from about 80 to about 60% (e.g., 70%) by weight isophthaloyl chloride and correspondingly about 10 to about 60% and preferably from about 20 to about 40% (e.g., 30%) by weight terephthaloyl chloride.

For smooth operation in a stirred solution polymerization, the resulting polymer product preferably should be about 10% or less on the basis of the total weight of the solvent although percentages as high as 25 % may be utilized depending upon the molecular weights of the polymer.

Generally substantially stoichiometric amounts of each reactant are employed; typical molar amounts of from 1:0.8:0.2 to about 1:0.2:0.8, of the ratio of bisphenol, isophthaloyl chloride, and terephthaloyl chloride, respectively, are utilized.

In calculating the amounts of reactants which are to be utilized to achieve a predetermined molecular weight the assumption is made that the reactants are pure and any error which may be introduced into said calculation as a result of this assumption is ignored. This assumption is made possible by the compensating effect on the feedback techniques described herein, which permit one to achieve a desired molecular weight in the absence of exact stoichiometric calculations.

Thus, the essence of the presently claimed invention lies in the ability to terminate the addition of the diacid halide to the bisphenol containing solution at the precise point necessary to obtain a polymer having a predetermined molecular weight without making complex preliminary calculations to determine exact stoichiometric requirements. The identification of this termination point or end point is achieved by a feedback mechanism wherein the viscosity of the polymer containing solution is monitored or sensed during or after the addition of the diacid halide to the bisphenol containing solution.

After the molecular weight which may be expressed as a weight average and/or number average and which is to characterize a final end product polymer has been determined, the viscosity of a solution (herein referred to as the solution viscosity limit) utilized in accordance with the solution polymerization reaction which is indicative of a degree of polymerization sufficient to yield said final end product polymer of the desired molecular weight must also be determined. This is achieved by relating the solution viscosity to molecular weight. Such a relationship cannot be easily obtained directly and therefore is generally obtained indirectly by expressing the molecular weight in terms of a standardized viscosity which takes into account the variations of viscosity as a result of variations in the concentration of the solution measured.

The preferable standardized viscosity utilized to relate molecular weight to solution viscosity is inherent viscosity. As is well known in the polymer art, the inherent viscosity is determined by measuring the relative viscosity of a 0.1% solution of the polymer at 25° C. in a suitable solvent, such as chloroform or a 10/7 (w/w) mixture of phenol/trichlorophenol. The viscosity of the polymer solution is measured relative to the solvent alone and the inherent viscosity (I. V.) is determined from the following equation:

$$I.V. = \frac{\ln \frac{V_2}{V_1}}{C}$$

In the above formula, $V_2$ is the efflux time of the solution, $V_1$ is the efflux time of the solvent, and C is the concentration expressed in grams of polymer per hundred milliliters of solution. As is also known in the polymer art, inherent viscosity is monotonically related to the molecular weight of the polymer.

The molecular weight of the halogenated aromatic polyesters may be determined by any method known to those skilled in the art such as illustrated by W. Sorenson and T. Campbell, *Preparative Methods of Polymer Chemistry* (1968) which is herein incorporated by reference.

The inherent viscosity value which relates the specific predetermined molecular weight to the solution viscosity limit is referred to as the "inherent viscosity limit."

More specifically, the "inherent viscosity limit" is hereby defined as the inherent viscosity of a polymer having a particular molecular weight which molecular weight corresponds to the predetermined molecular weight of a polymer sought to be prepared in accordance with the solution polymerization process of the present invention.

The "solution viscosity limit" is hereby defined as the viscosity of a solution containing a polymer having a particular inherent viscosity limit (i.e. a given predetermined molecular weight) measured under conditions which will be present during the actual solution polymerization.

Thus, a predetermined molecular weight of a given polymer can be expressed in terms of an "inherent viscosity limit" and a corresponding "solution viscosity limit."

The "inherent viscosity limit" is a standardized laboratory oriented value which can easily be expirically related to a predetermined molecular weight of a polymer and which serves to link the solution viscosity limit to said predetermined molecular weight. The "solution viscosity limit" is a commercially oriented parameter which is related to the predetermined molecular weight of a polymer by correlation with the "inherent viscosity limit" of the polymer and which serves to identify the end point at which the addition of the diacid halide to the bisphenol is terminated. As described above, the attainment of this end point is readily ascertained during the process of solution polymerization by directly sensing the viscosity of the solution containing the reactants and polymer product as the diacid halide is added to the bisphenol containing solution. Thus, when the sensed solution viscosity reaches a solution viscosity limit (i.e., the solution viscosity limit as determined by any sensing means) the addition or further addition of diacid halide to the bisphenol is terminated.

It is to be emphasized that although utilization of inherent viscosity to relate solution viscosity to molecular weight is preferred, any standardized viscosity index such as kinematic viscosity or intrinsic viscosity can provide the required relationship to permit the determination of the "solution viscosity limit."

The sensing of the solution viscosity may be accomplished by any suitable means, such as a Brookfield viscometer on withdrawn samples, or an in-line viscometer. Alternatively, the pressure drop of a constant volume flow through a recycle loop may be monitored and correlated to the soultion viscosity.

The preferred method for sensing the viscosity of the solution is to measure the change in torque of a constant speed agitator which is in contact with the polymer containing solution. Since the change in torque is a function of the change in solution viscosity the agitator can be calibrated to accurately determine the solution viscosity by any method well known to those skilled in the art.

The sensing of the solution viscosity may be continuous or intermittent the only requirement being that the sensing be sufficient to accurately indicate when the solution voscosity has reached the solution viscosity limit and to provide sufficient time to terminate the addition of the diacid halide before the solution viscosity limit is exceeded. It is therefore possible to tailor the rate of addition in accordance with the duration and type of sensing employed. Thus, the rate of addition may proceed in a manner similar to that utilized in a conventional titration process. Initially, therefore, an amount of diacid halide which is less than the amount necessary to achieve stoichiometric equivalence with the halogenated bisphenol and which is insufficient to drive the polymerization reaction to the extent necessary to reach the solution viscosity limit is rapidly added to the bisphenol containing solution. Said amount is determined by treating the reactants as if they contained no impurities and any error which might result therefrom is compensated for by the feedback mechanism described herein. Thus, as the purity of reactants and therefore the accuracy of the determination of such amounts improves, the rate of addition during the initial stages of polymerization may be increased and the initial sensing may be held to a minimum. When proceeding in this manner, the first feed which contains substantial amounts of the diacid halide may constitute from about 60 to about 95% of the amount of diacid halide necessary to achieve the stoichiometric equivalence for the bisphenol. After the first feed the viscosity of the solution rapidly increases and begins to approach the solution viscosity limit. Further addition of the diacid halide therefore should proceed at a decreasingly slower rate to avoid over-shooting the solution viscosity limit. The intermittent approach to sensing an addition of the diacid halide to the bisphenol solution is generally applicable to the batch type of process.

If it is desired to prepare the halogenated aromatic polyester by a continuous process the addition of the diacid halide to the bisphenol containing solution as well as the sensing of the solution viscosity is more conveniently carried out in a continuous manner. Thus, the viscosity of the bisphenol containing solution may be sensed from the first addition of the diacid halide until such addition is terminated. The rate of addition of the diacid halide to the bisphenol containing solution will be high during the initial stages of polymerization and decrease to zero at the solution viscosity limit.

In a preferred embodiment, the polymerization reaction may be carried out in a continuous manner, by which the reactants are continuously introduced into the reaction zone and the polymer product is continuously prepared and withdrawn. This may be achieved, for example by utilizing a cylindrical tube, having static mixers as a reaction vessel. The bisphenol containing solution is passed through the tube while adding the diacid halide at various points along the longitudinal axis in response to the viscosity of the polymer containing solution as it is sensed at the outgoing portion of the tube. Thus, the diacid halide is added in large amounts at the downstream portion of the tube and in gradually decreasing amounts at positions further upstream in the tube.

The final concentration of the polymer in solution is about 3 to about 25%, preferably from about 5 to about 20% and most preferably from about 7 to about 15%. At these percentages of concentration, the solution viscosity will generally vary from about 1 to about 3000 poise, preferably from about 5 to about 200 poise and most preferably from about 10 to about 1000 poise.

Polymerization is effective at temperatures which may vary from about 0 to about 200° C., preferably from about 10 to about 100° C., and most preferably from about 15 to about 150° C., and at pressures which may vary from about .01 to about 10 atmospheres and preferably from about 0.1 to about 10 atmospheres. Agitation of the reactants will be sufficient to evenly disperse the diacid halide throughout the bisphenol containing solution to avoid a build-up of the concentration of the diacid halide in a localized area within the reaction mixture. Such agitation may be supplied by any of the standard means of mixing such as by stirrier, shaker, static mixer, spray nozzle or other flowing agitating systems.

After polymerization the polymer is generally recovered by washing the polymer containing solution with dilute, aqueous hydrogen chloride to neutralize the excess acid acceptor. The polymer solution is then washed with water to remove salts and collected in any suitable manner such as by evaporation of the solvent or by precipitation of the polymer in a suitable non-solvent such as acetone or methanol. The polymer may then be concentrated to a desired spinning dope viscosity or diluted without isolation if the polymer is a solid, and thereafter processed for shaping, e.g., spun or cast for making fibers or films, respectively.

Generally, the solution polymerization technique described herein is utilized to control the molecular weight of the halogenated aromatic polyester in a manner sufficient to obtain a polymer having inherent viscosity (IV) limits which may vary from about 0.4 to about 1.7, preferably from about 0.6 to about 1.5, and most preferably from about 0.7 to about 1.2, which are indicative of polymers having a weight average molecular weight of about 25,000 to about 150,000, preferably from about 41,000 to about 127,000, and most preferably from about 50,000 to about 97,000.

The above described inherent viscosity ranges will generally correspond to solution viscosity limits of about 1 to about 3000 poise, typically from about 5 to about 1000 poise and preferably from about 30 to about 95 poise at the typical final solution concentrations described above.

The halogenated aromatic polyesters prepared by the process of the presently claimed invention may be dissolved in a suitable spinning or casting solvent, such as methylene chloride or tetrahydrofuran and formed into a shaped article, such as a fiber or film.

The halogenated aromatic polyesters described herein have been used to produce a number of inherently non-burning fibrous materials which offer the public a great degree of fire safety, particularly when fibrous articles are required for use in fire-control environments, e.g., children's sleepwear, suits for fire fighters, hospital furnishings, and uniforms for military and civilian personnel.

The following examples are given as specific illustrations of the claimed invention. It should be understood, however, that the invention is not limited to the specific details set forth in the examples. All parts and percentages in the examples as well as in the remainder of the specification are by weight unless otherwise specified.

EXAMPLE I

The objective of this example is to obtain a polymer with an inherent viscosity between 0.9 and 1.1 which corresponds to a weight average molecular weight (AW) of from 68,000 to about 87,000 and a solution viscosity limit of from about 40 to about 71 poise. Thus, a brominated aromatic polyester containing bromine chemically bound to an aromatic ring and possessing the structural formula heretofore illustrated where X and Y are bromine groups, R and R' are methyl groups and n is about 100 is prepared by solution polymerization in the following manner.

The amounts of reactants utilized in this example are based on theoretical stoichiometric requirements to achieve the desired molecular weight and no correction is made for other factors such as impurities in the reactants which might affect the theoretical requirements. Thus, 201.7 parts by weight of 4,4' - isopropylidene - 2,2' , 6,6' - tetrabromodiphenol are added to a reaction vessel containing about 1800 parts by weight of methylene chloride and 80 parts by weight of triethylamine under agitation.

A solution of a mixture of diacid halides comprising 44.7 parts by weight of previously distilled isophthaloyl chloride and about 29.8 parts by weight of previously distilled terephthaloyl chloride and 213.8 parts by weight of methylene chloride is then added at a rate of 3.37 liters per minute to the bisphenol containing solution over a period of time of about one half hour. and at a temperature of about 30° C. The viscosity of the resulting solution is then sensed by measuring the viscosity of an in line sample at 30° C with a Brookfield viscometer and found to be less than 2 poise.

An additional amount of the same diacid halide solution which has been diluted to about 2.5 percent by weight is then added at a rate of 0.76 liters per minute. After a period of time of about 20 to 30 minutes the solution viscosity increases to about 2 poise at 30° C. and the flow rate is decreased to 0.26 liters per minute over a period of about 20 to 30 minutes. The viscosity of the solutions is then sensed in the manner described above and found to be 20 poise. The previously diluted diacid halide solution is then charged to the reaction vessel at a flow rate of about 0.11 liters per minute in progressively shorter increments until the solution viscosity is sensed as being 45 poise at 30° C. This solution viscosity corresponds to an inherent viscosity limit of about 0.95 which meets the objective. At the termination of addition of the diacid halide solution the polymer is present at a concentration of about 10% by weight in the final reaction solution.

The polymer containing solution is then washed with a 5% solution of HCl and decanted to remove the triethylamine as a salt. This procedure is repeated four times. The polymer is then washed with distilled water to remove HCl until the pH remains constant. The washed polymer is then precipitated with methanol and recovered for molecular weight determination to confirm that the target molecular weight has been achieved.

The final mole ratios of the components utilized are 1 part tetrabrominated bisphenol, 1.02 parts of a 60:40 mixture of isophthaloyl and terephthaloyl chloride and 2.15 parts triethylamine.

The results of this example are summarized in Table I.

EXAMPLE II

Example I is repeated with the exception that the objective is to prepare a polymer having an inherent viscosity of about 1.1 to about 1.2 which corresponds to a weight average molecular weight (AW) of from about 87,000 to about 97,000 and a solution viscosity limit of from about 71 poise to about 95 poise.

The results of this example are summarized in Table I.

TABLE I

| Example | Solution Viscosity Limit | Inherent Viscosity Limit | AW |
|---|---|---|---|
| I | 45 poise | .95 | 73,000 |
| II | 84 poise | 1.15 | 92,000 |

EXAMPLE III

The objective of this example is to describe how the solution viscosity limit is determined. A target weight average molecular weight of 97,000 is determined wherein n of the structural formula is about 150 and the polymer utilized in Example I having said predetermined molecular weight is prepared. This is achieved by first determining the exact stoichoimetric requirements necessary to obtain a polymer of the desired molecular weight, taking into account such factors as purity of the reactants, solvent reactivity, side reactions of the diacid chlorides and amine acceptors and polymer hydrolysis. Thus, 201.7 parts of 4,4' - isopropylidene - 2,2', 6,6'-tetrabromodiphenol is added to a reaction vessel containing about 1800 parts by weight methylene chloride and 82 parts by weight triethylamine under agitation.

A solution of a diacid halide mixture comprising 46.0 parts by weight of previously distilled isophthaloyl chloride, 30.8 parts by weight of previously distilled terephthaloyl chloride and 320 parts by weight methylene chloride is then rapidly and completely added to the solution containing the bisphenol in a single increment and reacted therewith at a temperature of 35° C. The reaction vessel is cooled to terminate the reaction after a period of 1 hour when the polymer has achieved a maximum inherent viscosity of 1.2 which corresponds to the desired molecular weight. This inherent viscosity is then designated as the inherent viscosity limit for said target molecular weight. A sample of the resulting polymer solution, wherein the polymer is present in an amount of 10% by weight thereof, is removed from the reaction vesel and maintained at a temperature of 30° C. The solution viscosity of this sample is then determined by a Brookfield viscometer and found to be 95 poise. This solution viscosity is then designated as the solution viscosity limit for said target molecular weight. This procedure is repeated several times utilizing different target molecular weights. A table is then drafted which lists different target molecular weights and corresponding inherent viscosity limits and solution viscosity limits (e.g., at a typical polymer concentration described herein). Such a table is provided for a polymer prepared by reacting tetrabromobisphenol A and a 60:40 mixture of isophthaloyl: terephthaloyl chloride at Table II.

TABLE II

| Target Weight Average Molecular Weight | Inherent Viscosity Limit | Solution Viscosity Limit at 10% Polymer Conc. |
|---|---|---|
| 50,000 | 0.7 | 19 poise |
| 55,000 | 0.8 | 28 poise |
| 68,000 | 0.9 | 40 poise |
| 77,000 | 1.0 | 52 poise |
| 87,000 | 1.1 | 71 poise |
| 97,000 | 1.2 | 95 poise |
| 107,000 | 1.3 | 140 poise |

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for preparing a halogenated aromatic polyester having a predetermined molecular weight and of the recurring structural formula:

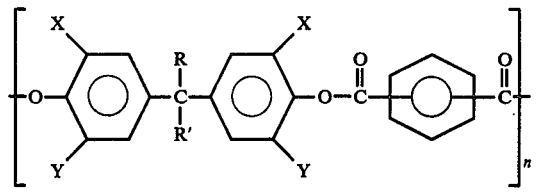

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 10, by the solution polymerization of a halogenated bisphenol and a diacid halide selected from the group consisting of isophthaloyl chloride, terephthaloyl chloride and mixtures thereof which comprises:

(I) providing a solution comprising
  (a) an organic solvent
  (b) a halogenated aromatic bisphenol, and
  (c) an acid acceptor;
(II) adding said diacid halide to the solution of I under conditions sufficient to react said diacid halide with the halogenated aromatic bisphenol of I to form a polymer;
(III) sensing the viscosity of the solution containing the resulting polymer; and (IV) terminating the addition of the diacid halide in response to the sensing of a predetermined solution viscosity limit.

2. The process according to claim 1 wherein said halogenated aromatic polyester of the recurring structural formula is a product of tetrabromobisphenol A and a mixture of about 45 to 75% by weight isophthaloyl chloride and correspondingly about 55 to about 25% by weight terephthaloyl chloride.

3. The process according to claim 1 wherein said halogenated aromatic polyester of the recurring structural formula is a product of tetrabromobisphenol A and a mixture of about 60% by weight isophthaloyl chloride and correspondingly about 40% by weight terephthaloyl chloride.

4. The process according to claim 1 wherein said halogenated aromatic polyester of the recurring structural formula is a product of tetrachlorobisphenol A and a mixture of about 90 to 40% by weight isophthaloyl chloride and correspondingly about 10 to 60% by weight terephthaloyl chloride.

5. The process according to claim 1 wherein said halogenated aromatic polyester of the recurring structural formula is a product of tetrachlorobisphenol A and a mixture of about 70% by weight isophthaloyl chloride and correspondingly about 30% by weight terephthaloyl chloride.

6. The process of claim 1 wherein the acid acceptor is a tertiary amine.

7. The process of claim 1 wherein the solution polymerization is carried out at a temperature of about 0° to about 200° C.

8. The process of claim 1 wherein the solution polymerization is carried out at a pressure of about 0.01 to about 10 atmospheres.

9. The process of claim 1 wherein the organic solvent is selected from the group consisting of methylene chloride, chloroform, tetrachloroethane, trichloroethane, chlorobenzene, chlorotoluene, dichloroethane, benzene, toluene, xylene, and mixtures thereof.

10. The process of claim 1 wherein the viscosity of the resulting polymer containing solution is sensed by measuring the change in torque of a constant speed agitator which is in contact with the polymer containing solution which change in torque is a function of a change in solution viscosity.

11. The process of claim 1 wherein the predetermined molecular weight is a weight average molecular weight which may vary from about 25,000 to about 150,000.

12. The process of claim 11 wherein the solution viscosity limits which correspond to said molecular weights may vary from about 1 to about 3000 poise.

13. A process for preparing a halogenated aromatic polyester having a predetermined molecular weight and of the recurring structural formula:

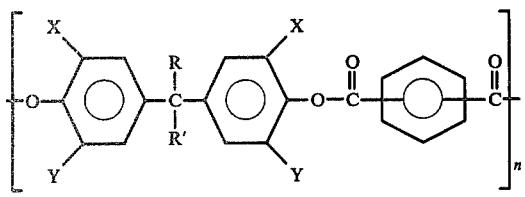

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 10, by the solution polymerization of a halogenated bisphenol and a diacid halide selected from the group consisting of isophthaloyl chloride, terephthaloyl chloride and mixtures thereof which comprises:

(I) providing a solution comprising
  (a) an organic solvent
  (b) a halogenated aromatic bisphenol, and
  (c) an acid acceptor;
(II) sensing the viscosity of the solution of I containing the halogenated aromatic bisphenol as said diacid halide is added thereto under conditions sufficient to react the halogenated aromatic bisphenol with said diacid halide to form a polymer thereby causing an increase in solution viscosity;
(III) controlling the addition of the diacid halide in response to the sensed solution viscosity as the sensed solution viscosity approaches a predetermined solution viscosity limit; and
(IV) terminating the addition of the diacid halide in response to the sensing of a predetermined solution viscosity limit.

14. The process of claim 13 wherein said controlled addition is achieved by gradually reducing the amount of the diacid halide, which is added to the solution containing the polymer, to zero as the sensed viscosity reaches the predetermined solution viscosity limit.

15. The process of claim 13 wherein said halogenated aromatic polyester of the recurring structural formula is a product of tetrabromobisphenol A and a mixture of about 45 to 75% by weight isophthaloyl chloride and correspondingly about 55 to about 25% by weight terephthaloyl chloride.

16. The process of claim 13 wherein said halogenated aromatic polyester of the recurring structural formula is a product of tetrabromobisphenol A and a mixture of about 60% by weight isophthaloyl chloride and correspondingly about 40% by weight terephthaloyl chloride.

17. The process of claim 13 wherein said halogenated aromatic polyester of the recurring structural formula is a product of a tetrachlorobisphenol A and a mixture of about 90 to 40% by weight isophthaloyl chloride and correspondingly about 10 to 60% by weight terephthaloyl chloride.

18. The process of claim 13 wherein said halogenated aromatic polyester of the recurring structural formula is a product of tetrachlorobisphenol A and a mixture of about 70% by weight isophthaloyl chloride and correspondingly about 30% by weight terephthaloyl chloride.

19. The process of claim 13 wherein the acid acceptor is a tertiary amine and mixtures thereof.

20. The process of claim 13 wherein the solution polymerization is carried out at a temperature of about 10° to about 100° C.

21. The process of claim 13 wherein the solution polymerization is carried out at a pressure of about 0.1 to about 10 atmospheres.

22. The process of claim 13 wherein the organic solvent is selected from the group consisting of methylene chloride, chloroform, tetrachloroethane, trichloroethane, chlorobenzene, chlorotoluene, dichloroethane, benzene, toluene, xylene and mixtures thereof.

23. The process of claim 13 wherein the viscosity of the resulting polymer containing solution is sensed by measuring the change in torque of a constant speed agitator which is in contact with the polymer containing solution which change in torque is a function of a change in solution viscosity.

24. The process of claim 13 wherein the predetermined molecular weight is a weight average molecular weight which may vary from about 41,000 to about 127,000.

25. The process of claim 24 wherein the solution viscosity limits which correspond to said molecular weights may vary from about 5 to about 1000 poise.

26. A process for preparing a halogenated aromatic polyester having a predetermined molecular weight and of the recurring structural formula:

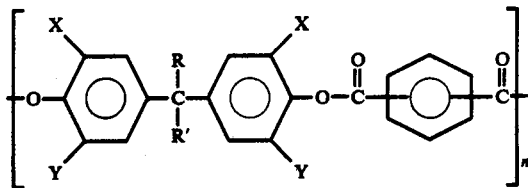

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 10, by the solution polymerization of a halogenated aromatic bisphenol and a diacid halide selected from the group consisting of isophthaloyl chloride, terephthaloyl chloride and mixtures thereof which comprises:

(I) providing a solution comprising:
  (a) an organic solvent
  (b) a halogenated aromatic bisphenol, and
  (c) an acid acceptor;
(II) adding an amount of said diacid halide to the solution of I, said amount being less than the amount necessary to achieve stoichiometric equivalence with the halogenated aromatic bisphenol, under conditions sufficient to react said diacid halide with the halogenated aromatic bisphenol of I to form a polymer;
(III) sensing the viscosity of the solution;
(IV) adding an additional amount of diacid halide in response to the sensed solution viscosity as the sensed solution viscosity approaches a predetermined solution viscosity limit; and
(V) terminating the addition of the diacid halide in response to the sensing of the predetermined solution viscosity limit.

27. The process of claim 26 wherein said halogenated aromatic polyester of the recurring structural formula is a product of tetrabromobisphenol A and a mixture of about 45 to 75% by weight isophthaloyl chloride and correspondingly about 55 to about 25% by weight terephthaloyl chloride.

28. The process of claim 26 wherein said halogenated aromatic polyester of the recurring structural formula is a product of tetrabromobisphenol A and a mixture of about 60% by weight isophthaloyl chloride and correspondingly about 40% by weight terephthaloyl chloride.

29. The process of claim 26 wherein said halogenated aromatic polyester of the recurring structural formula is a product of a tetrachlorobisphenol A and a mixture of about 90 to 40% by weight isophthaloyl chloride and correspondingly about 10 to 60% by weight terephthaloyl chloride.

30. The process of claim 26 wherein said halogenated aromatic polyester of the recurring structural formula is a product of tetrachlorobisphenol A and a mixture of about 70% by weight isophthaloyl chloride and correspondingly about 30% by weight terephthaloyl chloride.

31. The process of claim 26 wherein the acid acceptor is a tertiary amine.

32. The process of claim 26 wherein the solution polymerization is carried out at a temperature of about 15° to about 50° C.

33. The process of claim 26 wherein the solution polymerization is carried out at a pressure of about 0.1 to about 10 atmospheres.

34. The process of claim 26 wherein the organic solvent is selected from the group consisting of methylene chloride, chloroform, tetrachloroethane, trichloroethane, chlorobenzene, chlorotoluene, dichloroethane, benzene, toluene, xylene and mixtures thereof.

35. The process of claim 26 wherein the viscosity of the resulting polymer containing solution is sensed by measuring the change in torque of a constant speed agitator which is in contact with the polymer containing solution which change in torque is a function of a change in solution viscosity.

36. The process of claim 26 wherein the predetermined molecular weight is a weight average molecular weight which may vary from about 50,000 to about 97,000.

37. The process of claim 36 wherein the solution viscosity limits which correspond to said molecular weights may vary from about 30 to about 95 poise.

* * * * *